(12) United States Patent
Keskes et al.

(10) Patent No.: US 9,652,684 B2
(45) Date of Patent: May 16, 2017

(54) IMAGE PROCESSING FOR CLASSIFICATION AND SEGMENTATION OF ROCK SAMPLES

(71) Applicant: TOTAL SA, Courbevoie (FR)

(72) Inventors: Noomane Keskes, Abu Dhabi (AE); Stéphane Noyer, Abu Dhabi (AE)

(73) Assignee: TOTAL SA, Courbevoie (FR)

( * ) Notice: Subject to any disclaimer, the term of this patent is extended or adjusted under 35 U.S.C. 154(b) by 10 days.

(21) Appl. No.: 14/441,723

(22) PCT Filed: Nov. 7, 2013

(86) PCT No.: PCT/IB2013/002625
§ 371 (c)(1),
(2) Date: May 8, 2015

(87) PCT Pub. No.: WO2014/072810
PCT Pub. Date: May 15, 2014

(65) Prior Publication Data
US 2015/0310294 A1    Oct. 29, 2015

(30) Foreign Application Priority Data
Nov. 8, 2012    (EP) .................................... 12306381

(51) Int. Cl.
*G06K 9/38*    (2006.01)
*G06T 7/11*    (2017.01)
(Continued)

(52) U.S. Cl.
CPC .................. *G06K 9/38* (2013.01); *G06T 7/11* (2017.01); *G06T 7/136* (2017.01); *G06T 7/194* (2017.01)

(58) Field of Classification Search
CPC ......... G06T 7/0012; G06T 2207/20192; G06T 2219/2004; G06T 5/50; G06F 17/30598; G06F 3/0481; G06K 9/4604
See application file for complete search history.

(56) References Cited

U.S. PATENT DOCUMENTS

| 5,889,885 A | 3/1999 | Moed et al. | |
| 2011/0013847 A1* | 1/2011 | Statsenko | G06K 9/00456 382/224 |
| 2015/0262417 A1* | 9/2015 | Koroteev | G01N 33/24 382/109 |

FOREIGN PATENT DOCUMENTS

EP    2 124 042 A1    11/2009

OTHER PUBLICATIONS

Iassonov. Segmentation of X-ray computed tomography images of porous materials: a crucial step for characterization and quantitative analysis of pore structures. 2009. Water Resources Research, vol. 45, pp. 1-12.*

(Continued)

*Primary Examiner* — Siamak Harandi
*Assistant Examiner* — Mai Tran
(74) *Attorney, Agent, or Firm* — Patterson Thuente Pedersen, P.A.

(57) ABSTRACT

The present invention relates to method for processing an image, said image representing a rock sample. The method comprises receiving said image; for each current threshold value in a plurality of threshold values determining a threshold image, the threshold image having pixels associated with a first color value or a second color value, the determination of the threshold image being based on the received image and the current threshold; and for each current connected set of pixels associated with the first color value in the threshold image, determining a connected volume or a connected surface area of said current connected set of pixels. In (Continued)

addition, the method comprises determining numbers of connected sets of pixels associated with the first color value for a plurality of connected volumes or connected surface areas and for a plurality of thresholds.

6 Claims, 7 Drawing Sheets

(51) Int. Cl.
   *G06T 7/194* (2017.01)
   *G06T 7/136* (2017.01)

(56) References Cited

OTHER PUBLICATIONS

PCT International Search Report and Written Opinion for PCT/IB2013/002625, mailed Apr. 14, 2014, 12 pgs.
Pavel Iassonov et al: "Segmentation of X-ray computed tomography images of porous materials: A crucial step for characterization and quantitative analysis of pore structures", Water Resources Research, vol. 45, No. 9, Sep. 1, 2009 (Sep. 1, 2009), pp. n/a-n/a, XP055098114, ISSN: 0043-1397, DOI: 10.1029/2009WR008087.
O'Gorman L: "Binarization and Multithresholding of Document Images Using Connectivity", CVGIP Graphical Models and Image Processing, Academic Press, Duluth, MA, US, vol. 56, No. 6, Nov. 1, 1994 (Nov. 1, 1994), pp. 494-506, XP000546675, ISSN: 1077-3169, DOI: 10.1006/GMIP.1994.1045.

\* cited by examiner

IMAGE PROCESSING FOR CLASSIFICATION AND SEGMENTATION OF ROCK SAMPLES

RELATED APPLICATIONS

The present application is a National Phase entry of PCT Application No. PCT/IB2013/002625, filed Nov. 7, 2013, which claims priority from EP Patent Application No. 12306381.0, filed Nov. 8, 2012, said applications being hereby incorporated by reference herein in their entirety.

BACKGROUND OF THE INVENTION

The present invention relates to image analysis and especially for image representing a rock in order to determine rock geophysical properties at a microscopic level.

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section. Furthermore, all embodiments are not necessarily intended to solve all or even any of the problems brought forward in this section.

Determining geophysical properties and petro-elastic properties of the subsoil is important for geologists and engineers to create relevant models of petroleum or gas reservoirs.

This determination may be performed by obtaining an image (2D or 3D image, gray scale color image most of the time) of a piece of rocks obtained through core samples. Micro computed tomography methods may be used in order to such images (or MCT image): micro-scan method or FIPS beam method for instance.

A core plug may be considered to be solid comprising at least one matrix (normally a single matrix) with pores embedded in it.

Once this image is obtained, it is possible to "binarize" the image.

This step of gray scale binarization is very important as it determines the quality and the reliability of the rock properties computed from the MCT image.

Binarization is achieved by defining a threshold value that divide "grain-associated" gray scale values from the "pore-associated" gray scale values. Binarization comprises creating a new two colors image (white and black for instance), points of the new image corresponding to points of the initial image below a given threshold being white (and thus associated with pores for instance), points of the new image corresponding to points of the initial image above the given threshold being black (and thus associated with grain for instance).

If the threshold value is too low, the image pore space is under estimated and if the threshold value is too high, the image pore space is over estimated. Consequently, the geophysical properties of the rock are erroneous if the threshold value is not adequate.

Thus the determination of the adequate value of the threshold is highly important and there is a need for a correct determination.

Some practitioner may determine a lab measured porosity of a rock sample and try to obtain the same porosity by modifying the threshold. This method does not provide accurate result as the porosity of a rock sample may change significantly from one part of a sample to another part of the sample. At the very least, this method is very complex to enable if accurate result is needed. In addition, this method lacks physical basis: for example, it does not guarantee the continuity and therefore the uniqueness of the matrix (the grain-part of the rock sample) but only the porosity value of the rock sample.

There is thus a need for a method that provides accurate and adequate determination of the threshold to provide adequate geophysical properties and/or to guarantee continuity in the matrix of the rock sample.

SUMMARY OF THE INVENTION

The invention relates to a method for processing an image, said image representing a rock sample. The method comprises:
  /a/ receiving said image;
  for each current threshold value in a plurality of threshold values:
    /b/ determining a threshold image, the threshold image having pixels associated with a first color value or a second color value, the determination of the threshold image being based on the received image and the current threshold;
    /c/ for each current connected set of pixels associated with the first color value in the threshold image, determining a connected size of said current connected set of pixels;
    /d/ determining at least one number of connected sets of pixels associated with the first color value, said connected sets having a same connected size.

Therefore, a first histogram $CC_P[i,j]$ may be computed based on the determined number of step /d/. $CC_P[i,j]$ is a function of i the value of the current threshold value (i can take all value in the plurality of threshold values) and j an index that represents a connected size (or an interval of connected sizes). In addition, the index j may also represent an interval of size or a set of size value. The value of the histogram $CC_P[i,j]$ for a given i and j is the determined numbers of connected sets of pixels associated with the first color value for the connected size(s) j and for the threshold i (i.e. in a threshold image computed from the received image and with the threshold i).

A determined number of connected sets of pixels may represent a single point in the first histogram $CC_P[i,j]$. It is possible to reiterate step /d/ for a plurality of different connected sizes and for a plurality of threshold value.

A color value is only a value that may be represented as a color for graphical representation. For instance, a color value may be a string (e.g. "red"), a complex number (e.g. "0xFF56A3"), a simple integer (e.g. "3"), a Boolean value (e.g. "true"), etc. Any representations of a color value are possible.

A connected set of pixels may comprise only a single pixel. All pixels of the connected set of pixels are adjacent. No adjacent pixel (i.e. pixel that is not in this set of pixels and adjacent to at least one pixel of this set) is associated with the first color value.

Two pixels are adjacent if at least one point (respectively edge or face) is shared by these two pixels.

A size may be, for instance, a volume value or a surface area.

The connected size (i.e. the connected volume (3D case) or the connected surface area (2D case)) is the volume/surface area of the connected set. This size may be expressed in $m^3$ or in $m^2$ but may also be expressed in voxel (i.e. a volume element, representing a value on a regular grid in three dimensional space, such as a 3D pixel) or texel/pixmap (i.e. a surface element, representing a value on a regular grid in two dimensional space, such as a 2D pixel).

In addition, in the determination of step /d/, each set in said sets of pixels may have a connected size higher than a predetermined size. The method may further comprise:

/e/ determining a target threshold value based on the determined numbers of connected sets of pixels having a connected size higher than a predetermined size.

Thus, for instance, it is possible to determine a curve based on the determined numbers of connected sets of pixels. The determined number represents, for a given threshold, the number of sets that are bigger than a predetermined size.

Thanks to that curve, it is possible to determine a target threshold value. For instance, the target threshold represents a zone in that curve where the curve significantly increases.

In a possible embodiment, the determination of the target threshold value may be based on a derivative of the determined numbers of connected sets of pixels having a connected size higher than the predetermined size.

In a possible embodiment, the received image comprising pixels associated with a set of pixel color values, the method may further comprise:

/g/ for each current color value in the set of pixel color values, determining a number of pixels in the pixels of the received image associated with said current color value;

for each current threshold value in a plurality of threshold values
  /c'/for each current connected set of pixels associated with the second color value in the threshold image, determining a connected size of said current connected set of pixels;
  /d'/determining at least one number of connected sets of pixels associated with the second color value, said connected sets having a same connected size.

The determined numbers of pixels associated with said current value may enable a second histogram ($h_{GS}(i)$) representing the number (or the ratio) of pixels in the prepared input image associated with a color value i).

The determination of numbers of connected sets of pixels associated with the second color value for a plurality of connected sizes and for a plurality of thresholds may provide a third histogram ($CC_M[i,j]$) representing the number (or ratio) of connected sets of pixels associated with the second color value of size j when the prepared input image is binarized or threshold with the threshold value equal to i).

The first, the second and the third histograms may create a texture model that may be used for:
  classifying the rock sample,
  determining very easily petro/geo physical properties of the rock sample,
  etc.

A second aspect relates to a computer program product comprising a computer readable medium, having thereon a computer program comprising program instructions. The computer program is loadable into a data-processing unit and adapted to cause the data-processing unit to carry out the method described above when the computer program is run by the data-processing unit.

A third aspect relates to a device for processing an image, said image representing a rock sample. The device comprises:
  an input interface for receiving said image;
  a circuit for, for each current threshold value in a plurality of threshold values:
    determining a threshold image, the threshold image having pixels associated with a first color value or a second color value, the determination of the threshold image being based on the received image and the current threshold;
    for each current connected set of pixels associated with the first color value in the threshold image, determining a connected size of said current connected set of pixels;
    determining at least one number of connected sets of pixels associated with the first color value, each set in the sets of pixels having a connected size in at least one determined connected sizes.

Other features and advantages of the method and apparatus disclosed herein will become apparent from the following description of non-limiting embodiments, with reference to the appended drawings.

BRIEF DESCRIPTION OF THE DRAWINGS

The present invention is illustrated by way of example, and not by way of limitation, in the figures of the accompanying drawings, in which like reference numerals refer to similar elements and in which.

DETAILED DESCRIPTION OF THE DRAWINGS

Figure 1A:
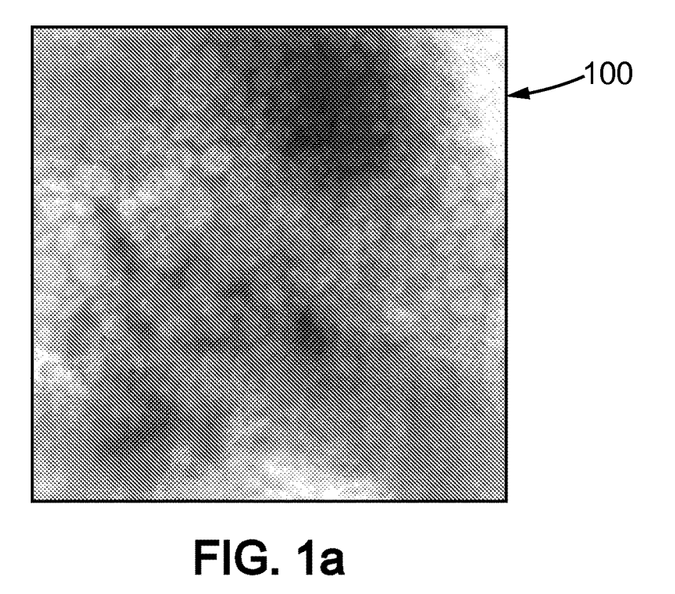
FIG. 1a is a possible 2D micro computed tomography image of a rock.

FIG. 1a is a possible 2D micro computed tomography image of a rock (or a slice of a 3D micro computed tomography image of a rock sample).

This image 100 may be obtained from of a piece of rocks (a core plug, for instance). A tomography method may be used in order to gain access to the internal structure of the piece of rocks.

The image comprises 2D pixels associated with a color value in a color scale. For instance, the color scale may be a gray color scale comprising integer values in the interval [0.255]. If the color format of the image is RGB, the color value of a pixel is [n,n,n] with n in the interval [0.255].

The image resolution is the resolution of a pixel of this image (i.e. the edge of each pixel) and may be about 0.3 µm-19 µm.

Figure 1B:
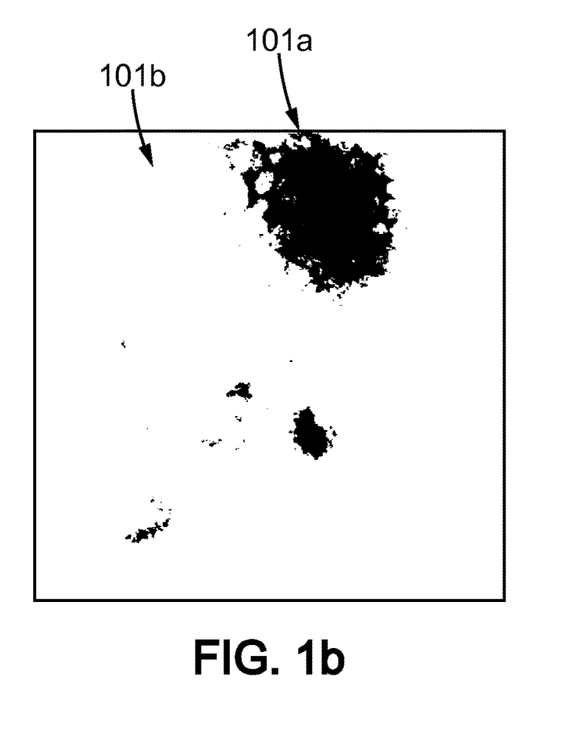
FIG. 1b to 1d are threshold images of the image of FIG. 1a for different values of a threshold.
Figure 1C:
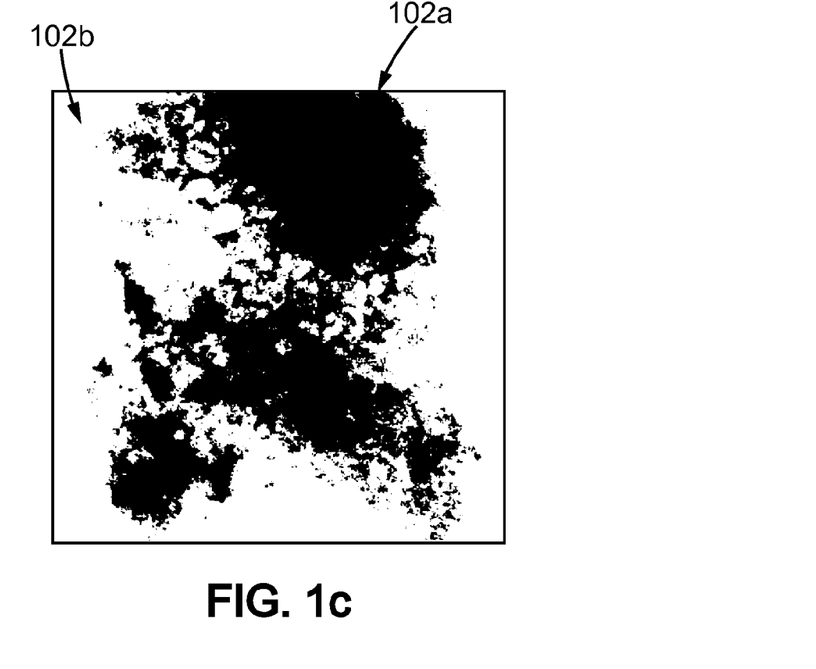
Figure 1D:
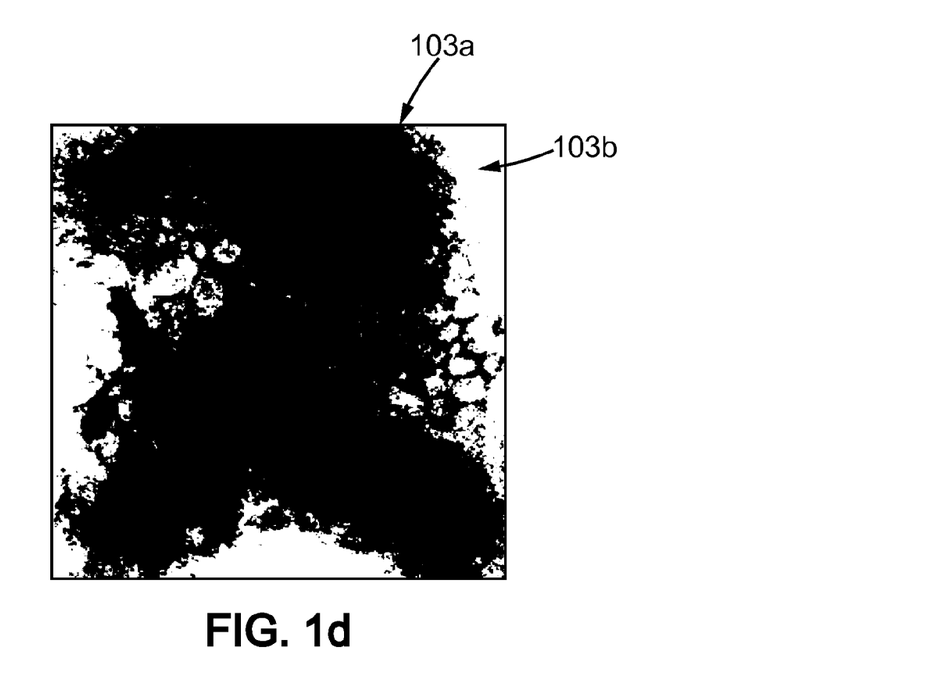

FIGS. 1b to 1d are threshold images of the image of FIG. 1a for different values of a threshold.

A threshold image is an image in which the pixels may only be associated with a value in two color values. If most of the time, the two color values are chosen to be black and white, these two color values may be arbitrarily chosen:
  1 and 0;
  "red" and "green";
  etc.

A threshold image is computed from an input image and from a given threshold value, this given threshold value being (in a possible embodiment) between the two extreme values of the possible color values of pixels in the input image. For instance, if the possible color values of pixels in the input image are between 0 and 255, it is possible to choose the threshold value equal to 107.

To obtain the threshold image, each pixels of the input image is analyzed and:
if this latter pixel has an associated color value below the threshold value, the corresponding pixel of the threshold image is associated with one of the two possible colors;
if this latter pixel has an associated color value above the threshold value, the corresponding pixel of the threshold image is associated with the other color in the two possible colors.

For instance, FIG. 1b is a threshold image for the input image of FIG. 1a and for a low threshold value (e.g. threshold 50 while the color value is in [0.255]): the white part 101b prevails over the black part 101a.

FIG. 1c is a threshold image for the input image of FIG. 1a and for a middle threshold value (e.g. threshold 123 while the color value is in [0.255]): the white part 102b and the black part 102a are equivalent.

FIG. 1d is a threshold image for the input image of FIG. 1a and for a high threshold value (e.g. threshold 200 while the color value is in [0,255]): the black part 103a prevails over the white part 103b.

Figure 2A:
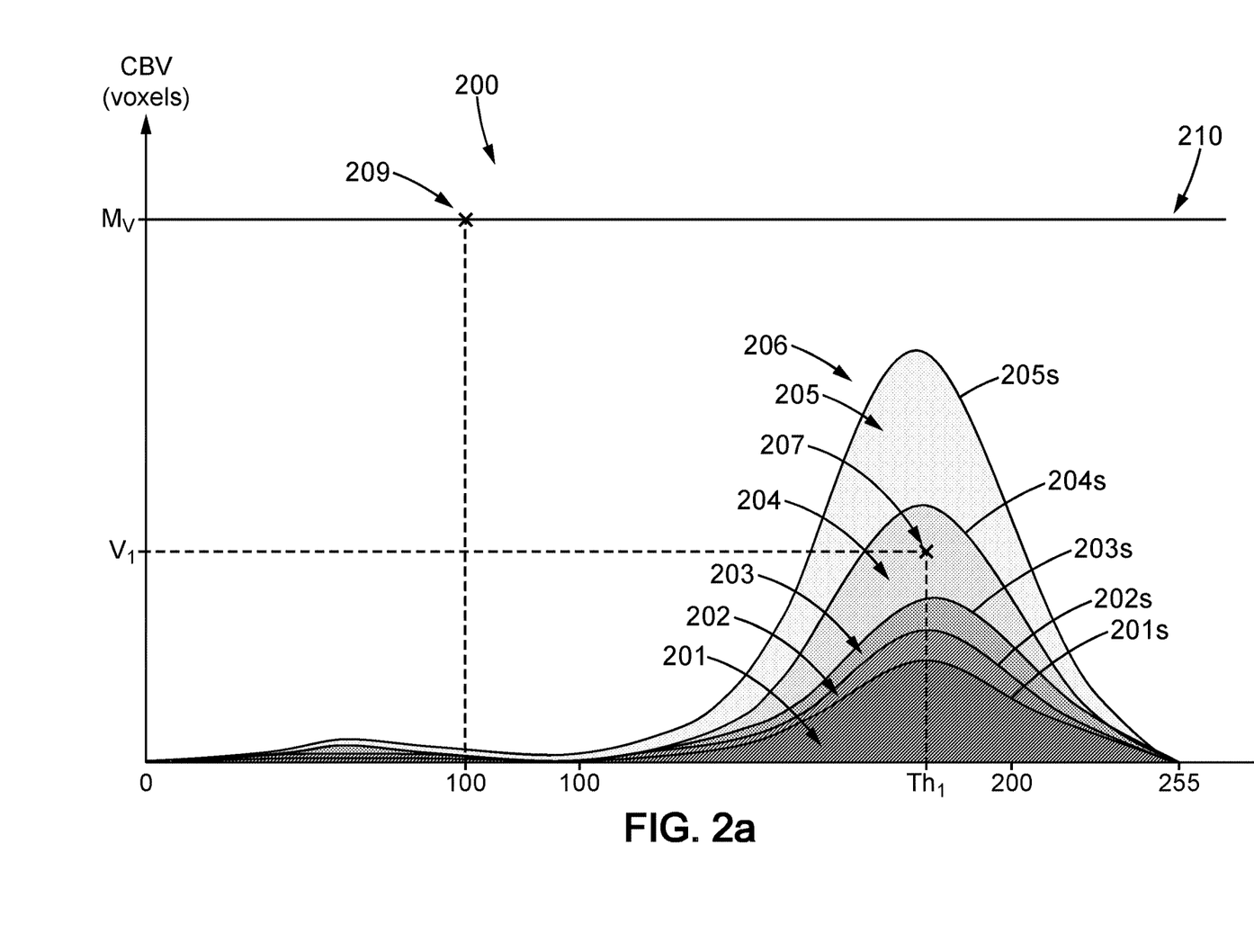
FIG. 2a is a histogram of numbers of connected sets of pixels per volume and per threshold value.

FIG. 2a is a histogram of numbers of connected sets of pixels associated with a given color value per volume, per threshold value, and for a given image.

A connected set of pixels associated with color C is a set of pixels in the image that are associated with the same color C and are adjacent (i.e. two pixels being adjacent if they share either a point, or an edge a face). Advantageously, no other connected set of pixels comprises another connected set of pixels (i.e. each connected set of pixels is maximal, said set being only adjacent to pixels of a color different from C).

Each point of the histogram 200 is associated with a number value. For instance, for the point 207 with coordinates $(Th_1;V_1)$ in the histogram, the number value corresponds to the number of connected sets of pixels verifying the following conditions:
the given image is threshold with a threshold value of $Th_1$;
pixels in a connected set of pixels of the threshold image is associated with a given color value (e.g. black color value);
the connected set of pixels of the threshold image do not have any pixel adjacent to this set and associated with the given color value (i.e. the connected set of pixels is maximal);
the size of the connected set of pixels of the threshold image is $V_1$ (or is in the interval $[V_1-\Delta V_1, V_1+\Delta V]$ with $\Delta V$ a predetermined interval value). This size maybe expressed in $m^3$ or in $m^2$ but may also be expressed in voxel (i.e. a volume element, representing a value on a regular grid in three dimensional space, such as a 3D pixel) or texel/pixmap (i.e. a surface element, representing a value on a regular grid in two dimensional space, such as a 2D pixel).

It is also possible that the number value is not related to a single size value (such as $V_1$) or a narrow size interval (such as $[V_1-\Delta V_1, V_1+\Delta V]$). It is possible that the number value is related to sizes that are higher to a predetermined value $M_V$. For instance, points on the line 210 of this histogram 200 is associated with number values that corresponds to the number of connected sets of pixels having a size in $[M_V 1+\infty]$. Thus, for instance, for the point 209 with coordinates $(Th_2;M_V)$ in the histogram, the number value corresponds to the number of connected sets of pixels verifying the following conditions:
the given image is threshold with a threshold value of $Th_1$;
pixels in a connected set of pixels of the threshold image is associated with a given color value (e.g. black color value);
the connected set of pixels of the threshold image do not have any pixel adjacent to this set and associated with the given color value (i.e. the connected set of pixels is maximal);
the size of the connected set of pixels of the threshold image is in $[M_V 1+\infty]$.

If the number value associated with each point of the histogram may be computed independently from the other points, it is possible to identify some trends in the histogram.
For instance:
Zone 201 (below curve 201s and above the axis Th) may comprise points for which the associated number value is above 1000 (i.e. more than 1000 sets of pixels for each point of this zone).
Zone 202 (below curve 202s and above curve 201s) may comprise points for which the associated number value is above 750 and below 1000 (i.e. more than 750 but less than 1000 sets of pixels for each point of this zone).
Zone 203 (below curve 203s and above curve 202s) may comprise points for which the associated number value is above 500 and below 750 (i.e. more than 500 but less than 750 sets of pixels for each point of this zone).
Zone 204 (below curve 204s and above curve 203s) may comprise points for which the associated number value is above 250 and below 500 (i.e. more than 250 but less than 500 sets of pixels for each point of this zone).
Zone 205 (below curve 205s and above curve 204s) may comprise points for which the associated number value is above 50 and below 250 (i.e. more than 50 but less than 250 sets of pixels for each point of this zone).
Zone 206 (below the line 210 and above curve 205s) may comprise points for which the associated number value is above 0 and below 50 (i.e. less than 50 sets of pixels for each point of this zone).
Line 210 represents the sets greater than the predetermined value $M_V$.

Curve 201s (respectively 202s, 203s, 204s and 205s) is a curve that creates a delimitation between points of the histogram with an associated number value greater than 1000 (respectively 750, 500, 250 and 50) and points of the histogram with an associated number value lesser than 1000 (respectively 750, 500, 250 and 50). Theses curves may be approximated based on a polynomial regression or on any types of regression.

Figure 2B:
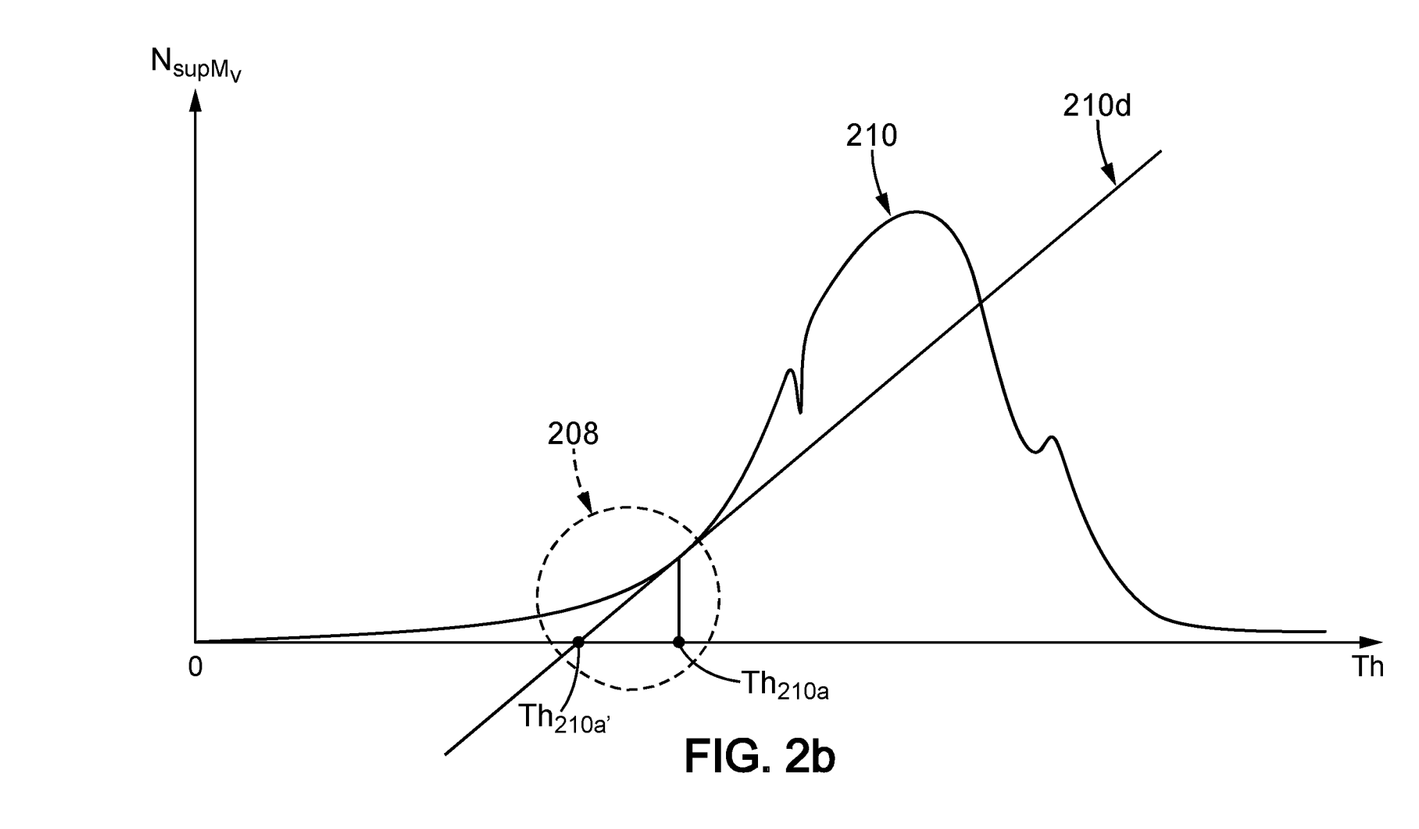
FIGS. 2b to 2c are examples of possible method to compute a relevant threshold value in order to compute a porosity value.
Figure 2C:
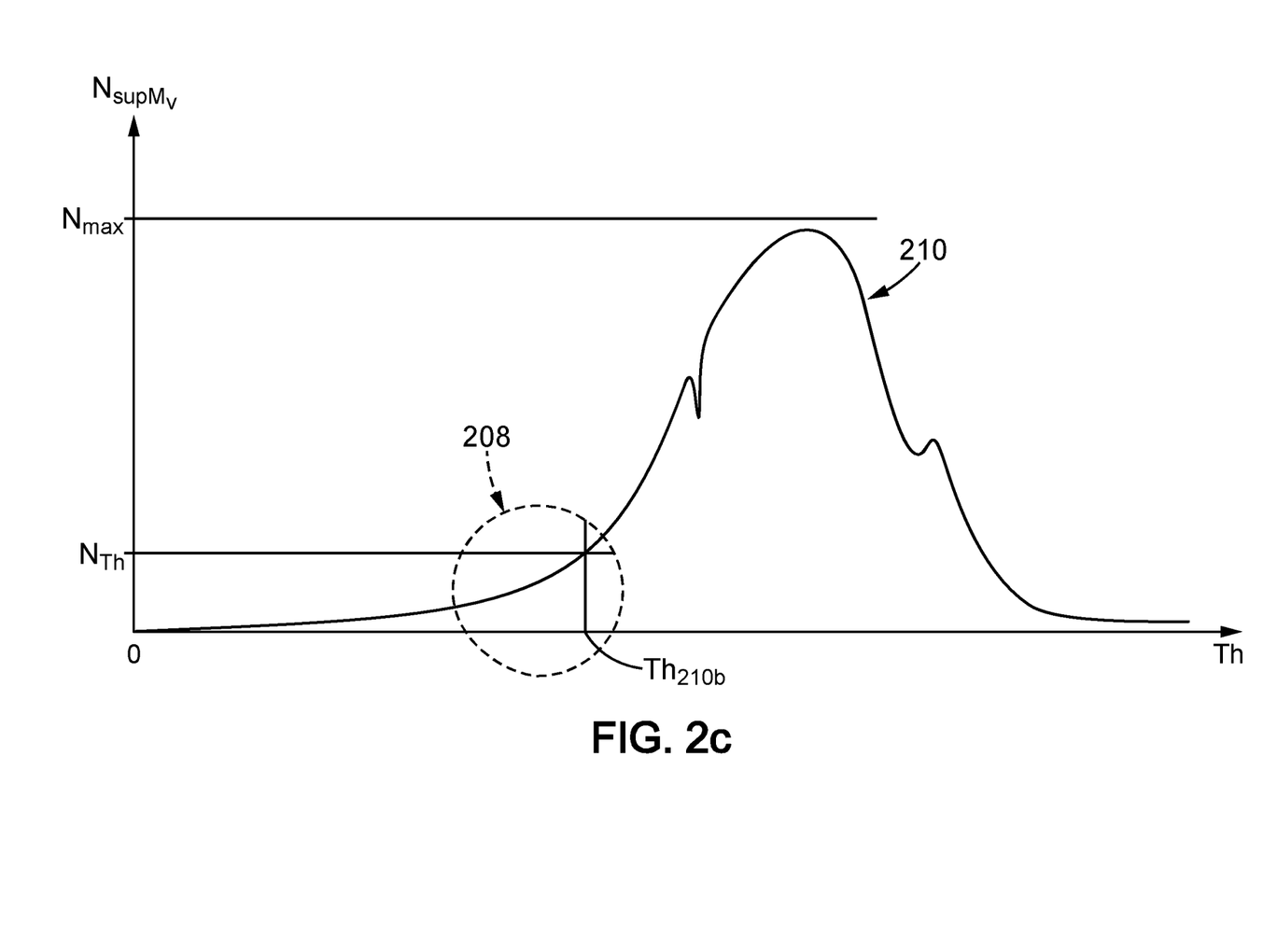

FIGS. 2b to 2c are examples of possible method to compute a relevant/adequate threshold value as described above.

The curve 210 represents the number of sets having a size greater than the predetermined value $M_V$ (see FIG. 2a). The abscissa axis $T_h$ represents the axis of the threshold value (like the abscissa of FIG. 2a) but the ordinate axis $N_{supMV}$ represents the number of sets of greater size (i.e. greater than $M_V$, see line 210 in FIG. 2a)

In order to determine a relevant threshold (i.e. that may be used to approximate, for instance, the porosity of the rock sample or any other geophysical properties), a number of methods may be used. The relevant threshold value is a value that is in a zone of the curve 210 where the number of sets increases significantly (i.e. zone 208). Indeed, this threshold is characterized by the fact that the matrix part of the rock sample is in one master part: if the number of big sets is too high, the probability that the rock sample should fall apart increases.

This relevant threshold value may be picked manually by an operator as the computed curve 210 provides an easy and visual mean to determine such zone 208.

Nevertheless, it is also possible to use deterministic methods to select the relevant threshold value.

A first possible method is illustrated with FIG. 2b. In this method, the following steps are executed:
- computing derivative values for points of the current curve
- determining an abscissa value ($Th_{210a}$) for which the derivative value is maximum (or higher than a predetermined value) in the computed derivative values;
- determining an intersection ($Th_{210a'}$) between an abscissa axis (e.g. axis Th) and the derivative line (e.g. 201d) at said determined abscissa value ($Th_{210a}$) for said current curve 210.

$Th_{210a}$ or $Th_{210a'}$ may be used as the relevant threshold.

A second possible method is illustrated with FIG. 2c. In this method, the following steps are executed:
- determining an abscissa value ($Th_{210b}$) for which the curve 210 is locally greater than a predetermined value ($N_{Th}$).

Figure 3:
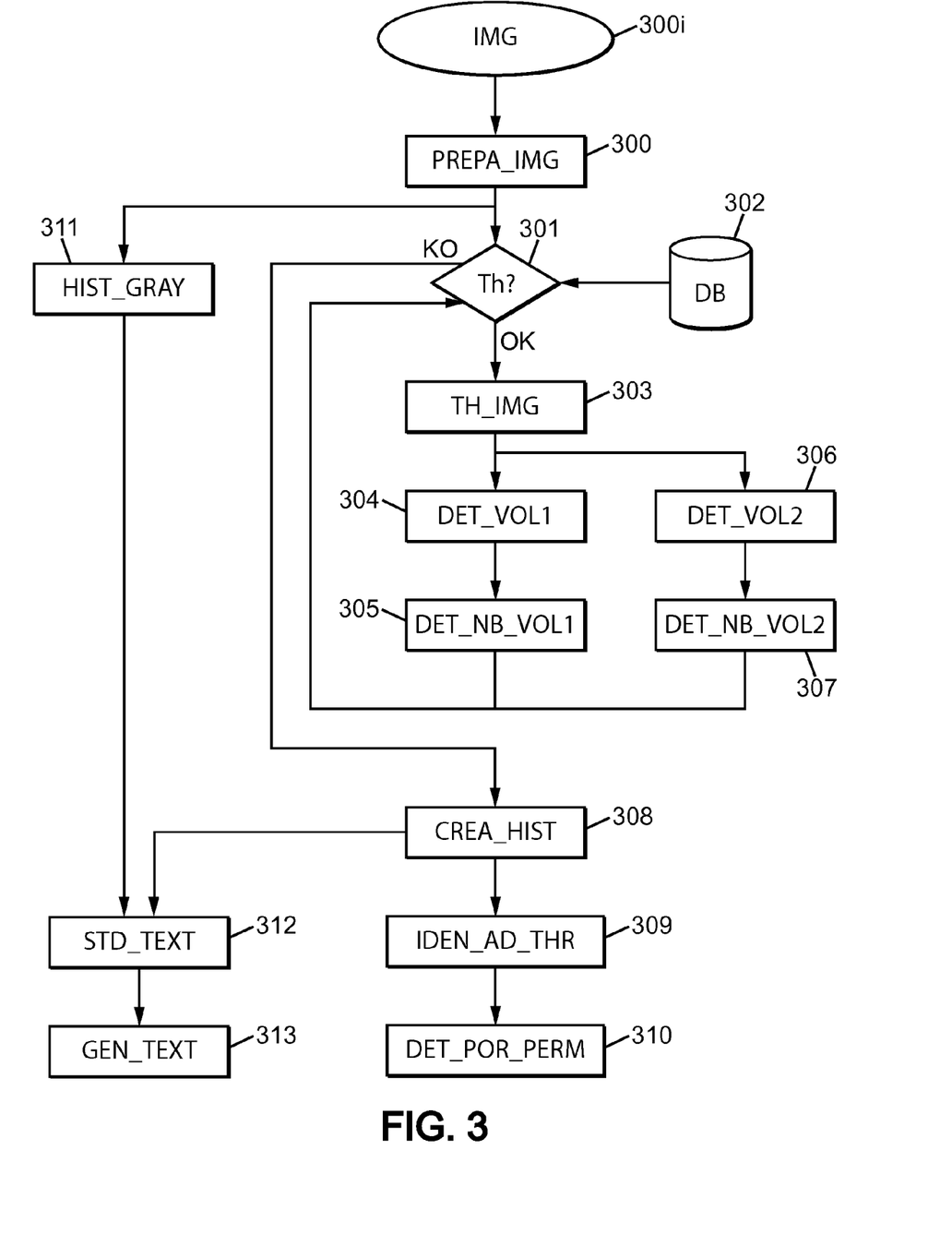
FIG. 3 is a flow chart describing a possible embodiment of the present invention.

FIG. 3 is a flow chart describing a possible embodiment of the present invention. Part of this flow chart can represent steps for an example of a computer program.

When receiving a 3D input image (300i), it is possible to prepare the input image (step 300) for the next steps of the processing. This preparation may be a conversion of the image in a specific/predetermined format (e.g. grayscale color, given resolution, etc.).

If a possible threshold value has not been used for processing the prepared input image (test 301, output OK, all possible threshold values may be stored in a database 302 or may be provided by an operator by an input interface), the prepared input image is threshold based on the possible threshold value as described in relation of FIGS. 1a to 1d.

In this embodiment, the 3D threshold image has two colors values: black (for the matrix portion of the image) and white (for the pore portion of the image).

It is then possible to determine a connected size of each connected set of white pixels in the threshold image (step 304). Thus, it is possible to determine (step 305) a plurality of numbers of connected sets of white pixels:
- for a plurality of sizes (e.g. 4 connected sets of white pixels having a size of 56 voxels, 15 connected sets of white pixels having a size of 57 voxels, 18 connected sets of white pixels having a size of 57 voxels, etc.); or
- for a plurality of size intervals (e.g. 25 connected sets of white pixels having a volume of 50-55 voxels, 53 connected sets of white pixels having a volume of 56-60 voxels, 85 connected sets of white pixels having a volume of 61-65 voxels, 1000 connected sets of white pixels having a volume greater than 70, etc.).

In fact, this last determination enables the initialization of one vertical line (i.e. parallel to the axis CBV, see FIG. 2a) of a histogram associated with white color value.

It is also possible to determine a connected volume of each connected set of black pixels in the threshold image (step 306). Thus, it is possible to determine (step 307) a plurality of numbers of connected sets of black pixels:
- for a plurality of sizes (e.g. 20 connected sets of black pixels having a volume of 33 voxels, 10 connected sets of white pixels having a volume of 34 voxels, 52 connected sets of white pixels having a volume of 35 voxels, etc.).
- for a plurality of size intervals (e.g. 19 connected sets of black pixels having a volume of 40-45 voxels, 20 connected sets of black pixels having a volume of 46-50 voxels, 150 connected sets of black pixels having a volume of 51-55 voxels, 100 connected sets of black pixels having a volume greater than 70, etc.).

In fact, this last determination enables the initialization of one vertical line (i.e. parallel to the axis CBV, see FIG. 2a) of a histogram associated with black color value.

If all possible threshold values have been used for processing the prepared input image (test 301, output KO), the histograms (one histogram associated with white color and one histogram associated with black color) are finalized (step 308).

These finalizations comprise the concatenation of all vertical lines determined in steps 304-305 and 306-307 (each vertical lines being ordered, for each color, according to the threshold values used to obtain the threshold image).

Once the histogram is computed, it is possible to determine an adequate threshold value (step 309), for instance as described in relation of FIGS. 2b to 2c. This "adequate" threshold value is used to determine an "adequate" threshold image (being a threshold image of the prepared input image with the adequate threshold value as threshold value).

The "adequate" threshold image may be used to determine a porosity value (step 310) by computing the ratio of the white volume in the image (i.e. the pore portion) over the total volume (i.e. the pore portion and the matrix portion). In addition, a permeability value in a given direction may be computed via simulation/mathematical algorithm assuming that the white pixels of the "adequate" threshold image represent void portion and the black pixels of the "adequate" threshold image represent matrix portion.

It may be advantageous to also compute a histogram of grayscale values (step 311). This histogram $h_{GS}(i)$ is a 2D histogram that represents a number of pixels having a given grayscale value i.

Indeed, this histogram combined with the previous computed histograms (step 308) may define a texture model of the rock sample represented by the image 300i. This texture model comprises three components:
- a grayscale histogram $h_{GS}(i)$ representing the number (or ratio) of pixels in the prepared input image associated with a color value i (grayscale);
- a pores connected histogram $CC_P[i,j]$ representing the number (or ratio) of connected sets of white pixels of size j when the prepared input image is binarized or threshold with the threshold value equal to i; and
- a matrix connected histogram $CC_M[i,j]$ representing the number (or ratio) of connected sets of black pixels of size j when the prepared input image is binarized or threshold with the threshold value equal to i.

The three histograms are complementary:
- the first histogram contains the first order statistic and its shape provides many indications on the characteristics of the input image (level of contrast, mono or bimodal shape indicating whether the image is easy or not to be segmented),
- the second and third histograms provide a description of the spatial distribution of the grayscale within the input image providing many petro/geo physical characteristics of the sample.

This texture model comprising the three histograms may be stored (step 312) in a database for future use.

Then it is possible to extrapolate texture to larger sample scales (step 313) based on that stored model.

In addition, it is possible, from a texture model to determine directly petro/geo physical measurements. For instance, it is possible to use mathematical methods (as described above) but they often are complex to solve. Advantageously, it is possible to use neural networks (for instance, Hall et al, 1996, and Jouini et al, 2008) to create connections relationship between texture parameters and petro/geo physical properties.

Figure 4:
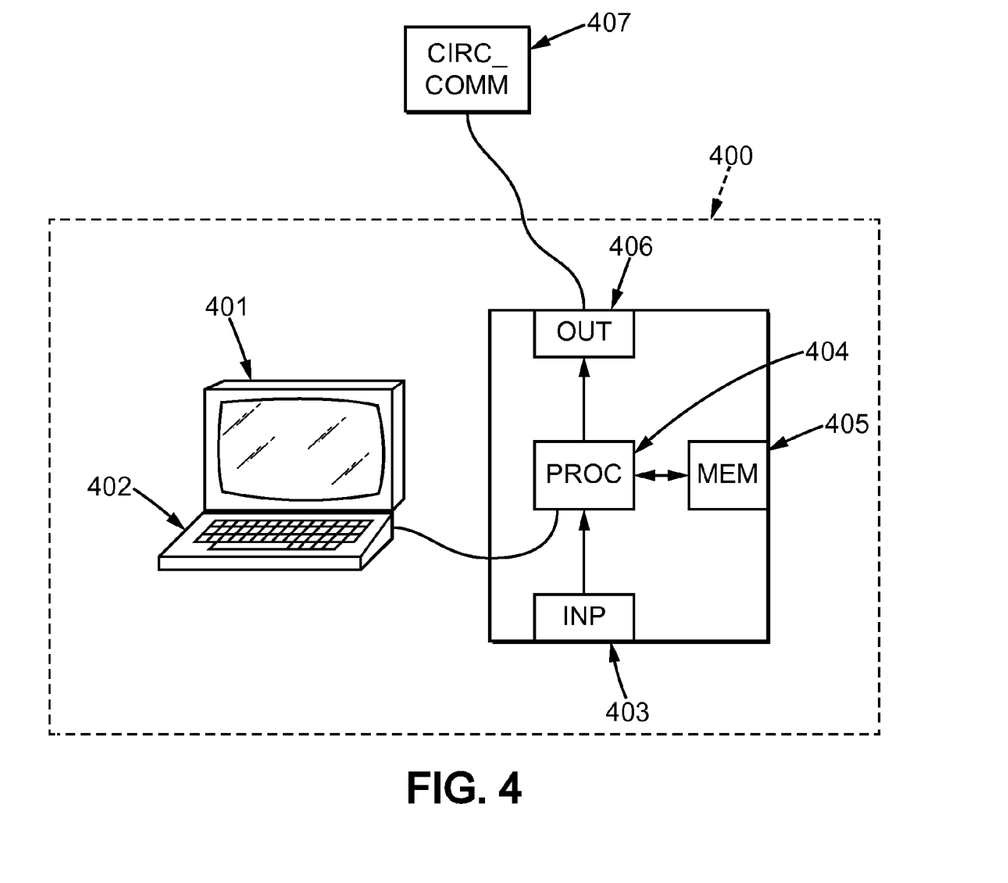
FIG. 4 is a possible embodiment for a device that enables the present invention.

FIG. 4 is a possible embodiment for a device that enables the present invention.

In this embodiment, the device 400 comprise a computer, this computer comprising a memory 405 to store program instructions loadable into a circuit and adapted to cause circuit 404 to carry out the steps of the present invention when the program instructions are run by the circuit 404.

The memory 405 may also store data and useful information for carrying the steps of the present invention as described above.

The circuit 404 may be for instance:
- a processor or a processing unit adapted to interpret instructions in a computer language, the processor or the processing unit may comprise, may be associated with or be attached to a memory comprising the instructions, or
- the association of a processor/processing unit and a memory, the processor or the processing unit adapted to interpret instructions in a computer language, the memory comprising said instructions, or
- an electronic card wherein the steps of the invention are described within silicon, or
- a programmable electronic chip such as a FPGA chip (for <<Field-Programmable Gate Array>>).

This computer comprises an input interface 403 for the reception of the MCT image according to the invention and an output interface 406 for providing the texture set or the adequate threshold.

The output interface 406 may be connected with:
- another computation module 407 to determine petro/geo physical properties of the rock sample;
- a texture model database in order to store the determined texture model (i.e. the set of three histograms described above).

To ease the interaction with the computer, a screen 401 and a keyboard 402 may be provided and connected to the computer circuit 404.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

A person skilled in the art will readily appreciate that various parameters disclosed in the description may be modified and that various embodiments disclosed may be combined without departing from the scope of the invention.

For instance, the embodiments describe 2D images but the teachings may also be applied to 3D images.

The invention claimed is:

1. A method for processing an image, said image representing a rock sample, wherein the method comprises:
   a) receiving said image;
   for each current threshold value in a plurality of threshold values:
   b) determining a threshold image, the threshold image having pixels associated with a first color value or a second color value, the determination of the threshold image being based on the received image and the current threshold;
   c) for each current connected set of pixels associated with the first color value in the threshold image, determining a connected size of said current connected set of pixels;
   d) determining at least one number of connected sets of pixels associated with the first color value for which the connected size is identical;
   e) creating a plurality of histograms based on the determined at least one number of connected sets of pixels associated with a color value for which the connected size is identical;
   f) creating a texture model from the plurality of histograms; and
   g) classifying the rock sample based on the texture model.

2. The method according to claim 1, wherein in the determination of step d), each set in said sets of pixels have a connected size higher than a predetermined size; and wherein, the method further comprises:
   h) determining a target threshold value based on the determined numbers of connected sets of pixels having a connected size higher than the predetermined size.

3. The method according to claim 2, wherein the determination of the target threshold value is based on a derivative of the determined numbers of connected sets of pixels having a connected size higher than the predetermined size.

4. The method according to claim 1, wherein, the received image comprising pixels associated with a set of pixel values, the method further comprises:
   h) for each current color value in the set of pixel values, determining a number of pixels in the pixels of the received image associated with said current color value; wherein for each current threshold value in a plurality of threshold values:
   c') for each current connected set of pixels associated with the second color value in the threshold image, determining a connected size of said current connected set of pixels;
   d') determining at least one number of connected sets of pixels associated with the second color value for which the connected size is identical.

5. A non-transitory computer readable storage medium, having stored thereon a computer program comprising program instructions, the computer program being loadable into a data-processing device and adapted to cause the data-processing device to carry out the steps of claim 1 when the computer program is run by the data-processing device.

6. A device for processing an image, said image representing a rock sample, wherein the device comprises:
   an input interface for receiving said image;
   a circuit for, for each current threshold value in a plurality of threshold values, said circuit
   determining a threshold image, the threshold image having pixels associated with a first color value or a second color value, the determination of the threshold image being based on the received image and the current threshold; for each current connected set of pixels associated with the first color value in the threshold image, determining a connected size of said current connected set of pixels; and
   determining at least one number of connected sets of pixels associated with the first color value for which the connected size is identical;

creating a plurality of histograms based on the determined at least one number of connected sets of pixels associated with a color value for which the connected size is identical;
creating a texture model from the plurality of histograms; and
classifying the rock sample based on the texture model.

\* \* \* \* \*